(12) United States Patent
Keeler

(10) Patent No.: US 7,766,352 B2
(45) Date of Patent: Aug. 3, 2010

(54) ROLL STABLE VEHICLE SUSPENSION SYSTEM

(75) Inventor: Michael J. Keeler, Blacklick, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 11/965,725

(22) Filed: Dec. 27, 2007

(65) Prior Publication Data

US 2008/0252032 A1 Oct. 16, 2008

Related U.S. Application Data

(63) Continuation of application No. 11/759,674, filed on Jun. 7, 2007, now abandoned, which is a continuation of application No. 10/870,544, filed on Jun. 18, 2004, now abandoned.

(51) Int. Cl.
*B60G 9/00* (2006.01)

(52) U.S. Cl. .................. 280/124.116; 280/124.106; 280/124.107; 280/124.11

(58) Field of Classification Search .......... 280/124.116, 280/124.106, 124.107, 124.11, 124.109, 280/124.128, 124.129, 124.132
See application file for complete search history.

(56) References Cited

U.S. PATENT DOCUMENTS

| 6,270,282 B1 * | 8/2001 | McLaughlin ................. 403/158 |
| 6,527,286 B2 * | 3/2003 | Keeler et al. ........... 280/124.135 |
| 2002/0117816 A1 * | 8/2002 | Dudding et al. .......... 280/6.151 |

* cited by examiner

*Primary Examiner*—Eric Culbreth
(74) *Attorney, Agent, or Firm*—Matthew A. Pequignot; Pequignot + Myers LLC

(57) ABSTRACT

A highly roll stable suspension system for a truck, trailer, or semi-trailer. In at least one embodiment, the suspension includes at least three beam structures, one beam being located beneath each respective longitudinal side frame member of the vehicle, and a third beam being located midpoint between the side frame members and which occupies substantially less space than the space between these opposing longitudinal side frame members of the vehicle.

26 Claims, 10 Drawing Sheets

ROLL STABLE VEHICLE SUSPENSION SYSTEM

This invention relates to suspension systems for vehicles and, in particular, especially for vehicles of the medium and heavy duty truck and semi-trailer type. More particularly, this invention finds special efficacy for use in vehicles having high levels of center of gravity which make them otherwise vulnerable to rollover.

BACKGROUND OF THE INVENTION

It is well recognized in the art of vehicle suspension design and especially in the art of designing suspensions for trucks, trailers and so-called semi-trailers of the medium and heavy duty type (which vehicles exhibit a rather high center of gravity), that an essential safety feature of any such suspension design must have the requisite amount of "roll stability," a term used herein according to its well-understood meaning in the art of vehicle (and suspension) design.

Absent the requisite amount of roll stability, i.e., this important safety feature for highway and general operation safety, a truck, trailer or semi-trailer having a relatively high center of gravity compared, for example, to an ordinary automobile, is subject to the problem known as "roll over," e.g., rolling or tipping over when driving around a curve or cornering, or in a high speed braking situation, etc. (particularly when on a downgrade and, more particularly, if fully loaded so as to increase its effective center of gravity for roll over purposes).

For this reason, various attempts, some successful and some only partially successful, have been made to achieve an acceptable level of "roll stability" (i.e., as defined above, the ability to resist roll over during use). In this respect, an example of a suspension which is highly roll stable is disclosed in U.S. Pat. No. 6,527,286 having an overlapping inventive entity herewith. In this patented suspension, a high level of roll stability is achieved by employing a special fabricated structure located between the opposing, longitudinal side rails of the vehicle (e.g., truck, semi-trailer, etc.). As disclosed in this patent, such a roll stabilizing structure may assume various different configurations, such as, for example, a true box-like structure, an "X" shape or a "Y" shape. For convenience, these structures may be conveniently referred to generically as a "torque box." In each instance, these torque boxes extend substantially and often completely between opposing longitudinal side, frame rails of the vehicle.

While highly effective to prevent roll over, i.e., obtain a high level of roll stability, these torque boxes consume, by their nature, design, and location, a large amount of space between the frame rails of the vehicle, under the truck or semi-trailer body which could otherwise be used more advantageously for other componentry, such as air tanks, dump body hoists, drive shafts, etc. Moreover, these suspensions still require, despite the use of a torque box between the frame rails, the use of radius rods for suspension alignment and stability, including wheel tracking during travel.

Thus, the use of these so-called "torque boxes," while highly advantageous to prevent roll over and achieve both roll stability and a high level of safety, as well as ride comfort, nevertheless, add substantial weight to the vehicle. Such added weight (1) may often reduce the amount of cargo that can be lawfully carried under existing highway weight limit laws; (2) reduce fuel economy; and (3) reduce the space available for locating other desirable auxiliary componentry under or between the frame rails of the vehicle.

In view of the above, it is apparent that there exists a need in the art for a new suspension design which achieves or exceeds the desirable level of roll stability and safety of the above-described prior art, e.g., of the suspensions disclosed in the aforesaid U.S. Pat. No. 6,527,286, but which does so in a manner that reduces weight and decreases the space taken up by the roll stabilizing componentry when compared to the aforesaid '286 patented suspension.

It is a purpose of this invention to fulfill this need in the art, as well as other needs in the art that will become more apparent to the skilled artisan once given the following disclosure:

SUMMARY OF THE INVENTION

Generally speaking, this invention fulfills the above-described needs in the art by providing, in a wheel bearing axle suspension system for connection to a pair of opposing, spaced longitudinal frame members of a vehicle located on opposite sides of the vehicle, a suspension system which includes, with respect to each of the pair of longitudinal, side located vehicle's frame members, a beam locatable beneath and in substantially the same vertical plane with respect to its frame member, each beam being connected at a first end to a hanger bracket connectable to the frame member and connected at a second end to an air bellows, also connectable to the same frame member as the hanger bracket. Further included are means for connecting an axle to these two beams. An improvement of this invention comprises means for increasing the roll stability of the suspension which means are located between the pair of longitudinal side frame members, so as to occupy substantially less than the entire horizontal or lateral distance between the pair of opposing longitudinal side frame members of the vehicle.

In at least one embodiment, this invention provides a suspension system having three longitudinal beams which are so located with respect to each other such that they form a cross-sectional, equilateral triangle in a vertical plane with each other such that the third beam is the apex of the triangle and the first and second lower beams are located within substantially the same horizontal plane with respect to each other, when the suspension system is in its travel position.

In at least one embodiment, the three longitudinal beams described in the specification herein are formed of a continuous top plate and a continuous bottom plate joined together by opposing, spaced side plates. In certain embodiments, each spaced side plate has an orifice therein extending substantially the entire width of the plate.

In at least one embodiment, a torque arm is employed with a suspension system which comprises pivot means located at each end thereof, an upper and a lower pair of substantially horizontal plates and a pair of orificed, spaced and substantially vertical plates so located between said upper and lower plates such that said upper and lower plates are substantially parallel with respect to each other.

In addition, this invention further includes a novel torque arm useful in the above-described suspension systems, as well as others. This novel torque arm comprises a pivot means located at each end thereof, an upper and a lower pair of substantially horizontal plates and a pair of orificed, spaced and substantially vertical plates so located between the upper and lower plates such that the upper and lower plates are substantially parallel with respect to each other, said torque arm being of a substantially lesser width than the distance between the opposing side, longitudinal frame members of the vehicle on which it is employed.

DETAILED DESCRIPTION OF THE INVENTION

Figure 1:
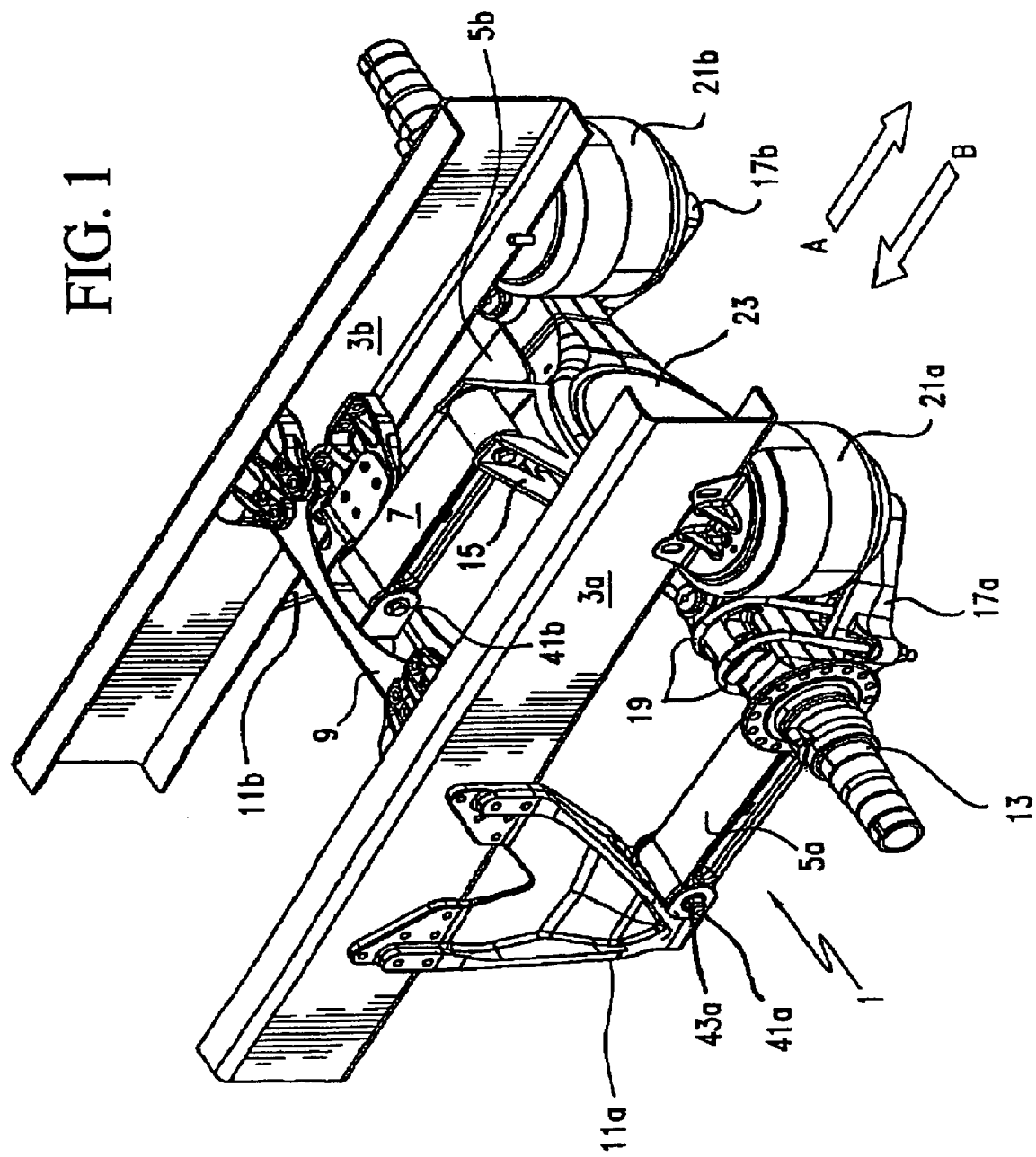
FIG. 1 is a three dimensional perspective view of an embodiment of this invention without wheels, as installed on the longitudinal frame rails of a vehicle.
Figure 2:
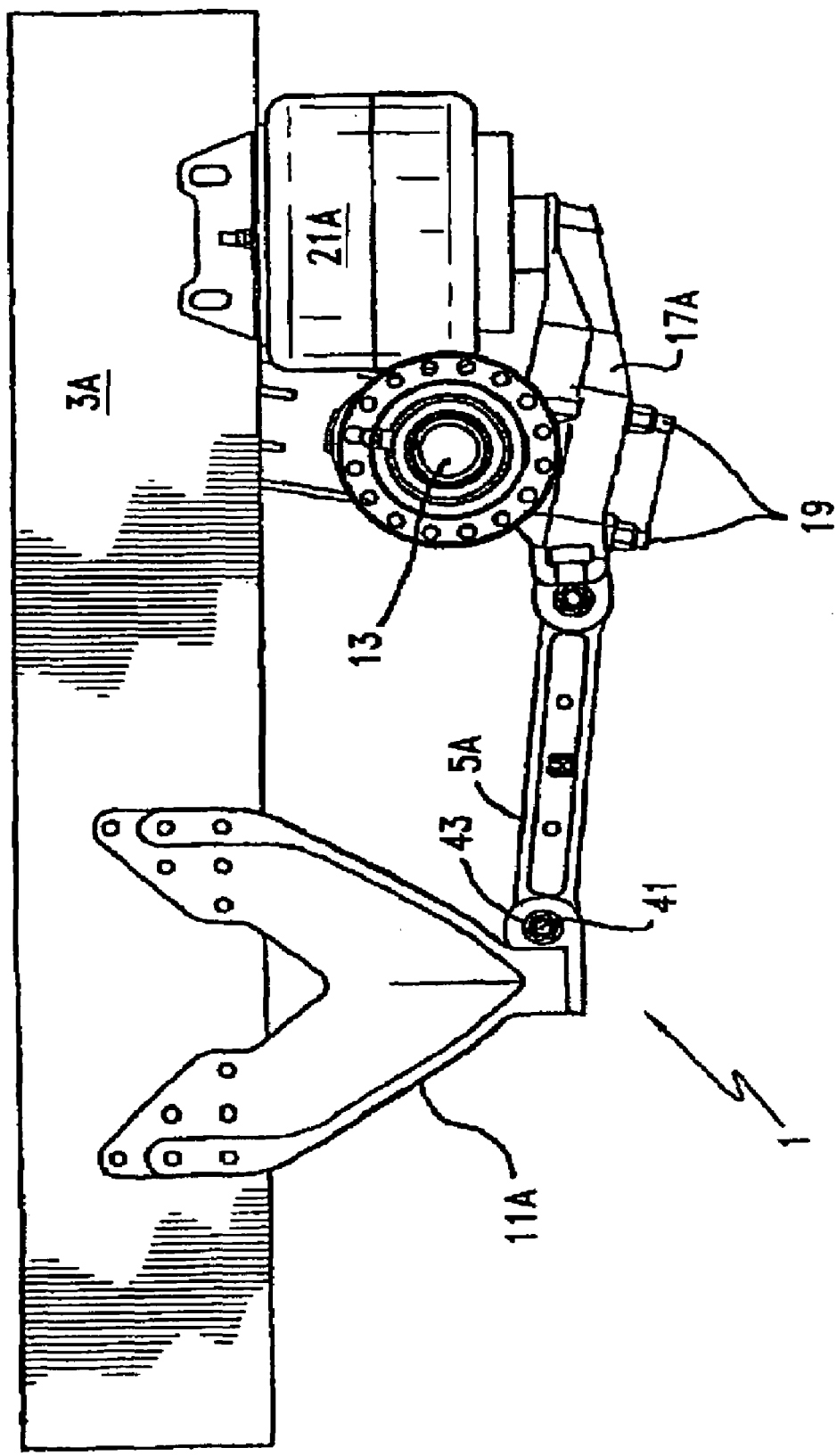
FIG. 2 is a side view of the embodiment of FIG. 1.
Figure 3:
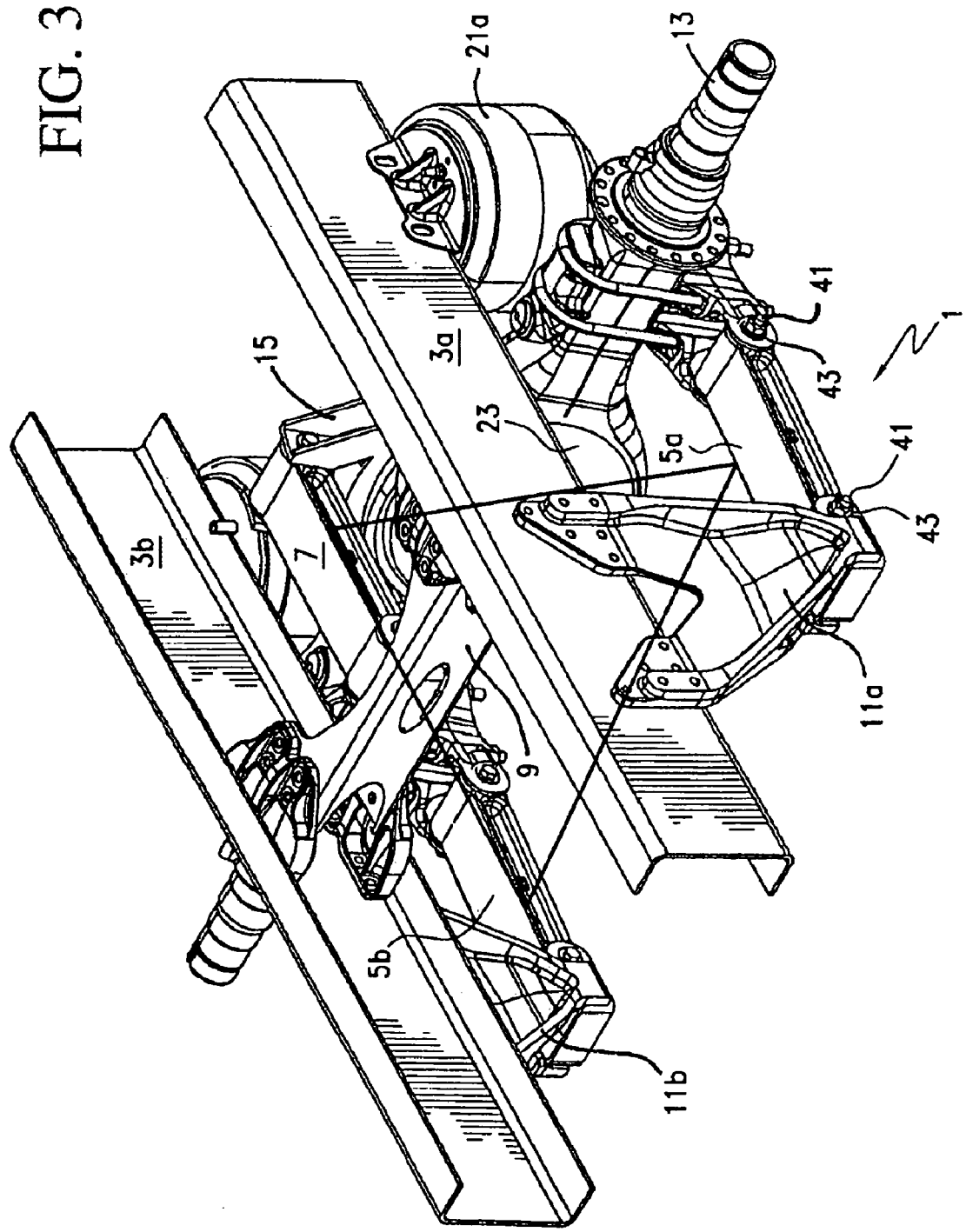
FIG. 3 is a further three dimensional perspective view of the embodiment of FIG. 1 as viewed from a different direction with a triangle shown schematically.
Figure 4:
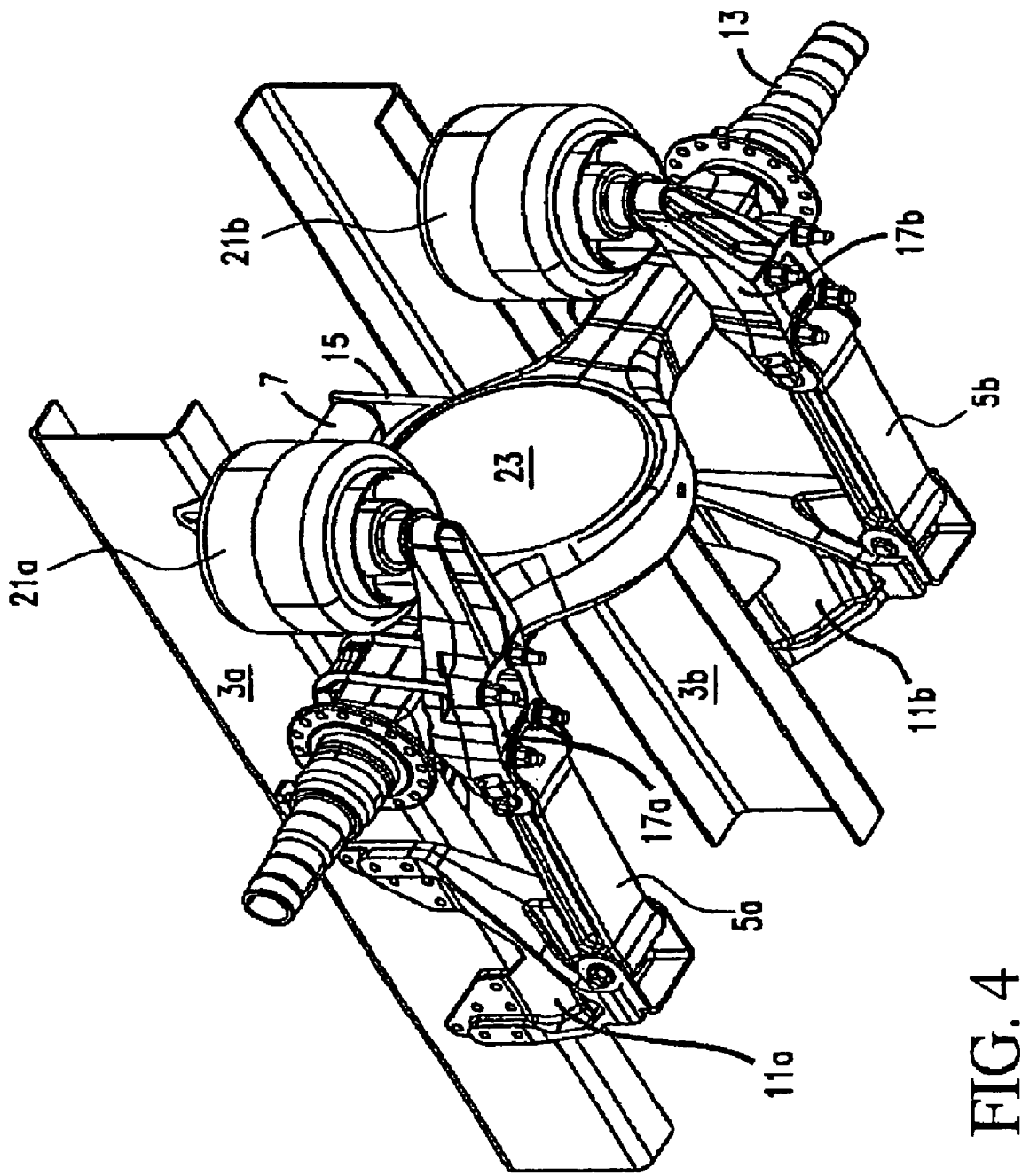
FIG. 4 is a further three dimensional perspective view of the embodiment of FIG. 1 as viewed from beneath a vehicle when installed thereon.
Figure 5:
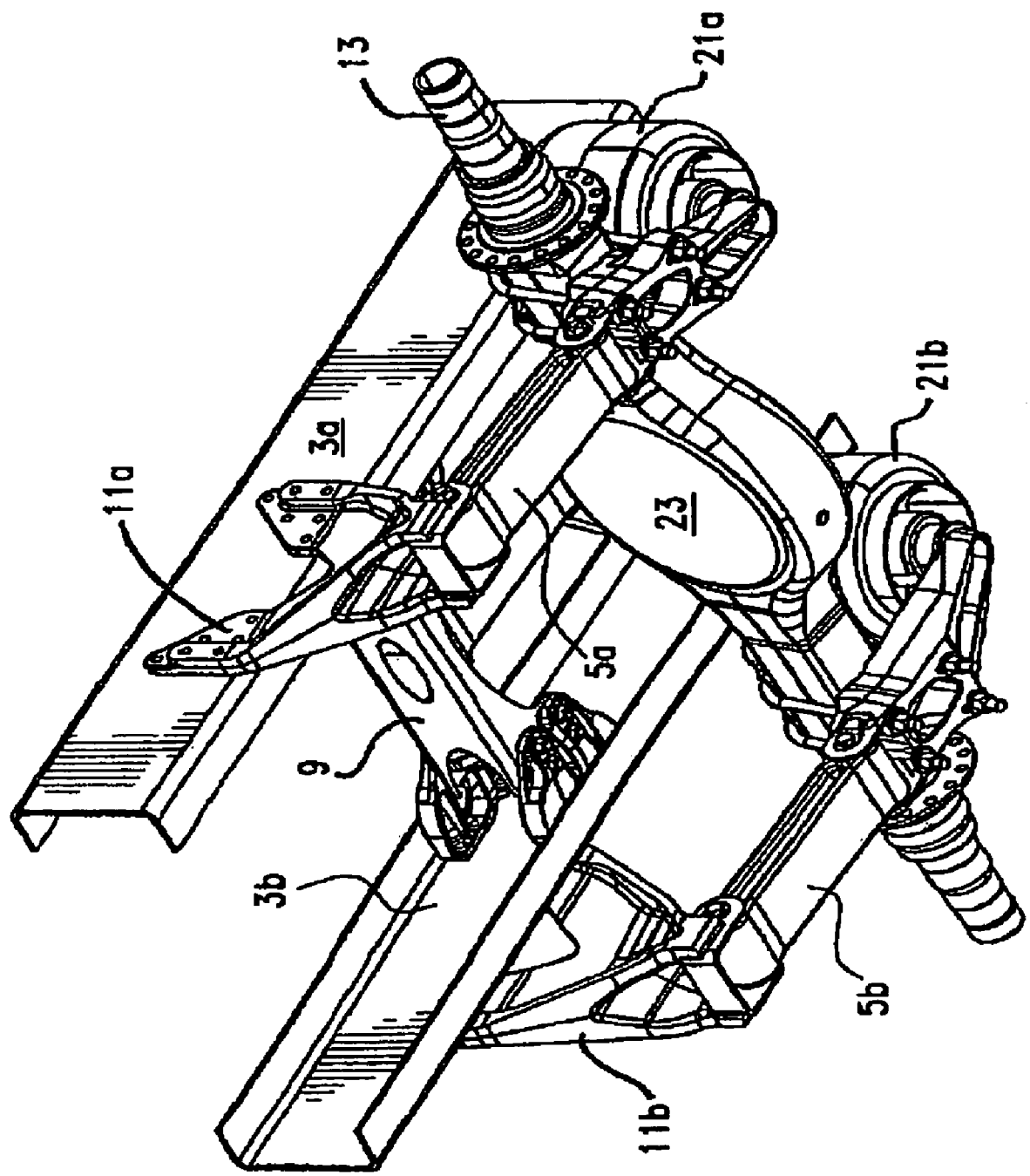
FIG. 5 is a further three dimensional perspective view of the embodiment of FIG. 1 as viewed from beneath a vehicle when installed thereon from a different direction than FIG. 4.
Figure 6:
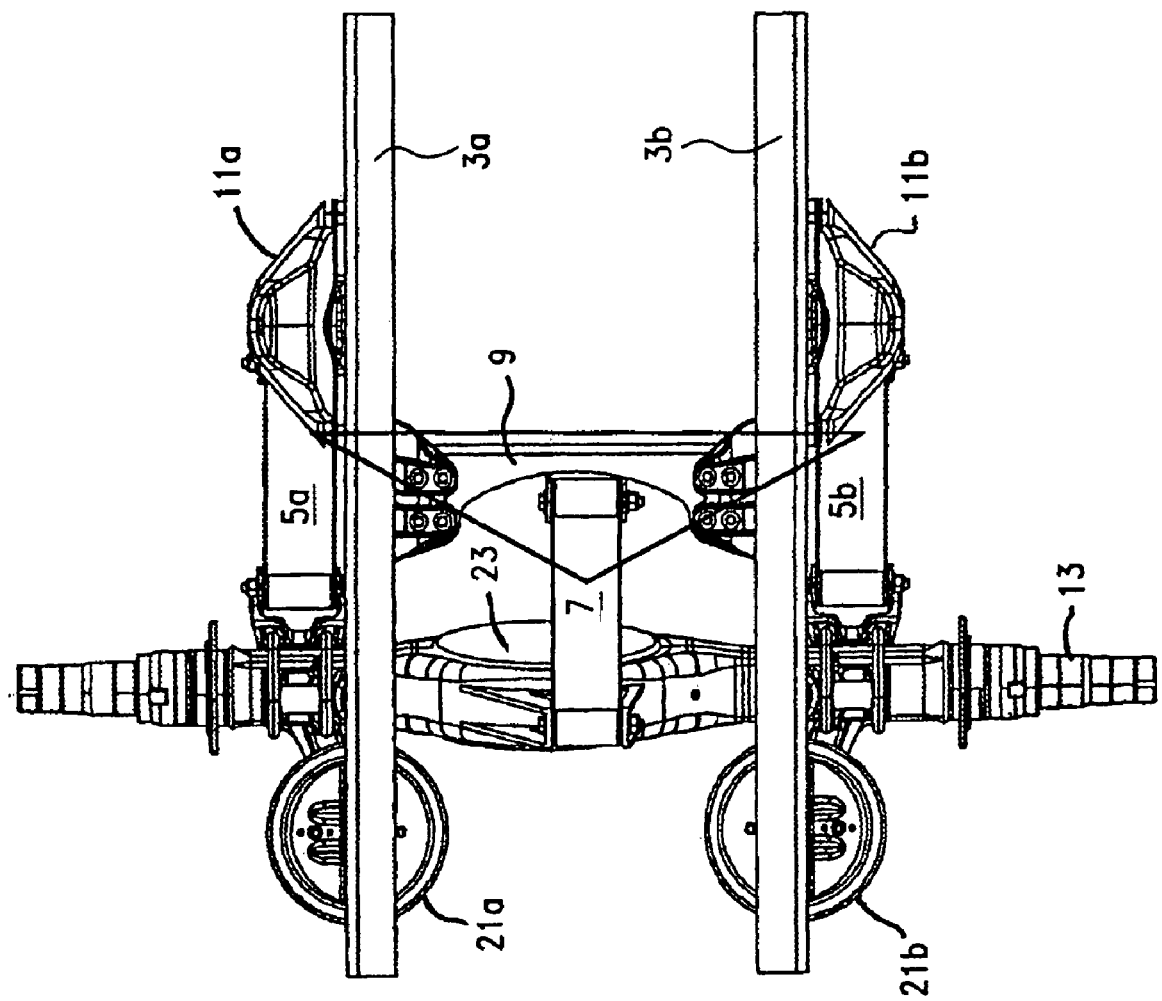
FIG. 6 is a top view of the embodiment of FIG. 1 with the triangle shown schematically.
Figure 7:
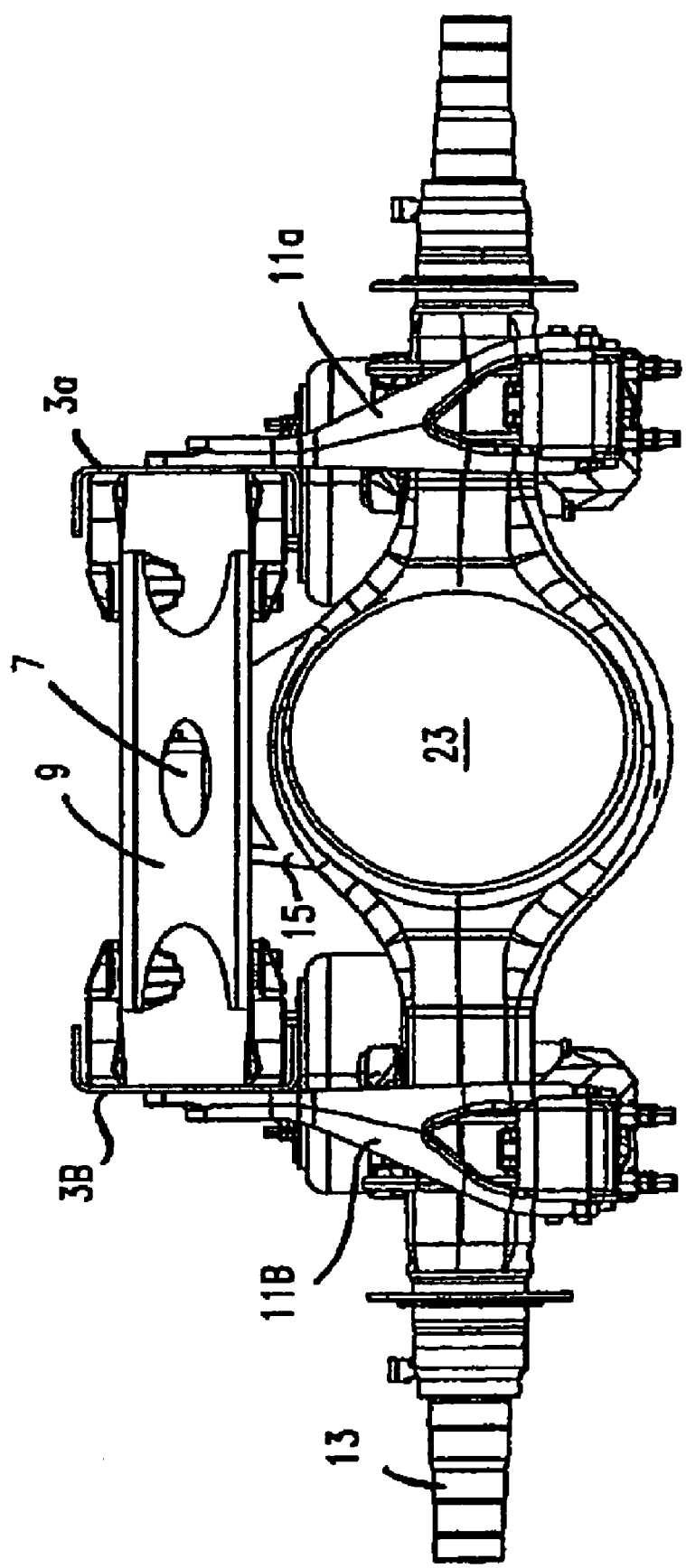
FIG. 7 is either a front or rear view of the suspension of this invention, depending upon whether the suspension is installed as a "leading arm" or "trailer arm" (respectfully) suspension on the vehicle.
Figure 8:
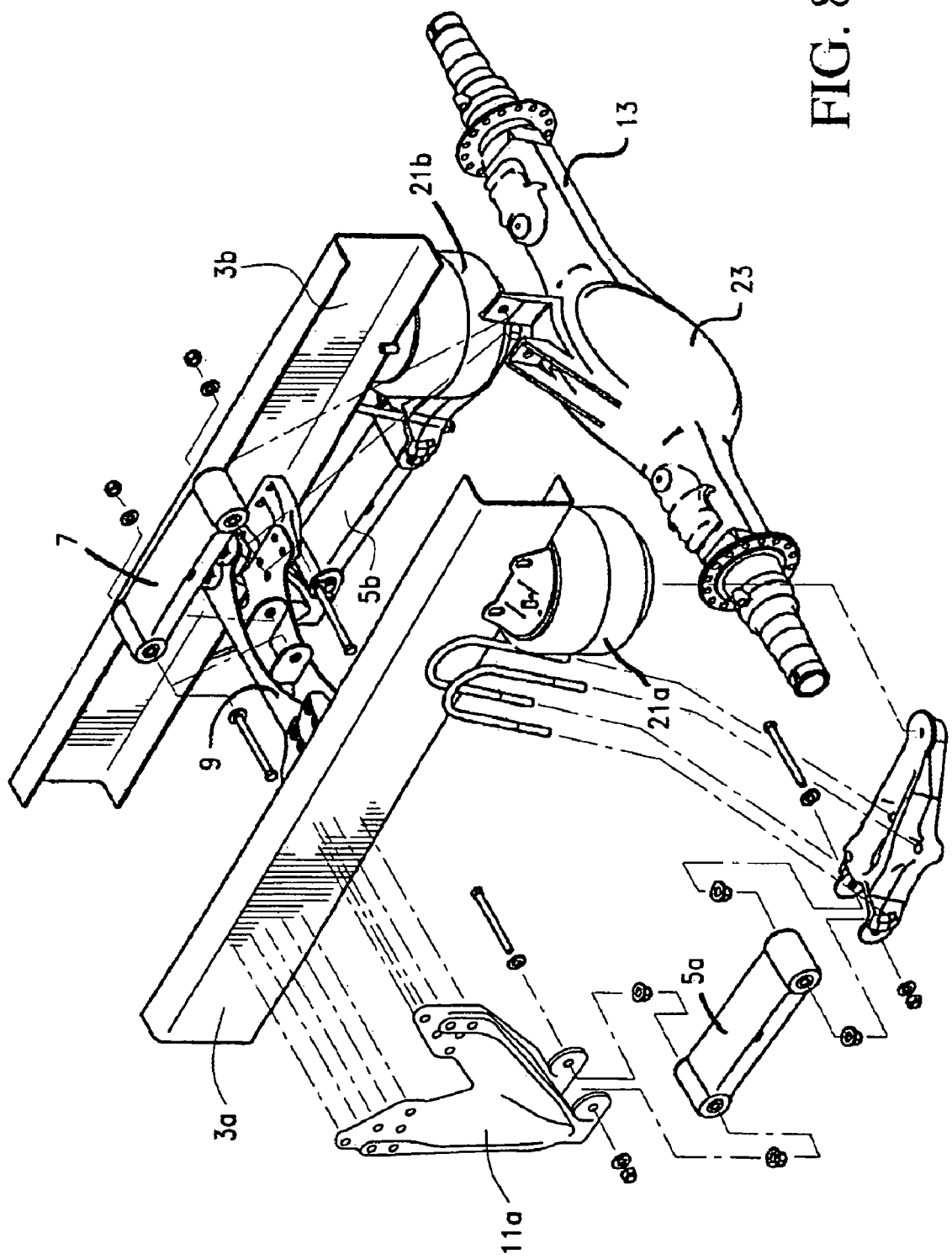
FIG. 8 is an exploded perspective view of the embodiment of FIG. 1.

With reference to the drawings and initially to FIG. 1, there is illustrated a preferred embodiment of the unique suspensions of this invention. FIGS. 2-8 further illustrate, as described above, different views of this same embodiment of FIG. 1. Referencing then FIGS. 1-8, suspension 1 is mounted in conventional fashion to the opposing longitudinal frame members 3a and 3b of a vehicle such as a medium or heavy duty truck, trailer, or semi-trailer. Of course, the suspension in certain situations may also be used, when needed or desirable on light duty vehicles. However, due to the exceptional roll stability (i.e., the ability of the suspension to resist roll over during cornering, braking, side-dumping, cargo-shifting and the like) of the suspension of this invention, they find particularly high utility in the medium and heavy duty class of vehicles, such as those vehicles with a rather high center of gravity, particularly when loaded and whose GVWR (gross vehicle weight rating) places them in the conventionally known class of a medium or heavy duty vehicle. Typical of such vehicles are those rated at a GVWR of 36,000 lbs. or more.

Suspension 1 is shown here as a non-liftable suspension. It is understood that such a suspension may be conventionally constructed (not shown for convenience) to be a so-called liftable axle suspension, such as by the mechanism disclosed in U.S. Pat. No. 5,403,031. Generally speaking, for example, this may be accomplished by adding a second longitudinal beam above and parallel to each of longitudinal beams 5a and 5b in a manner well within the level of the skilled artisan once given the disclosure of the above '031 patent, which disclosure is incorporated herein by reference.

As a part of the structure which creates the high level of safety and roll stability in the suspensions of this invention and as illustrated in the drawings, e.g., FIG. 1, there is provided a third longitudinal beam 7, in addition to beams 5a, 5b. All three beams 5a, 5b and 7 are, in the preferred embodiments of similar construction.

Figure 9:
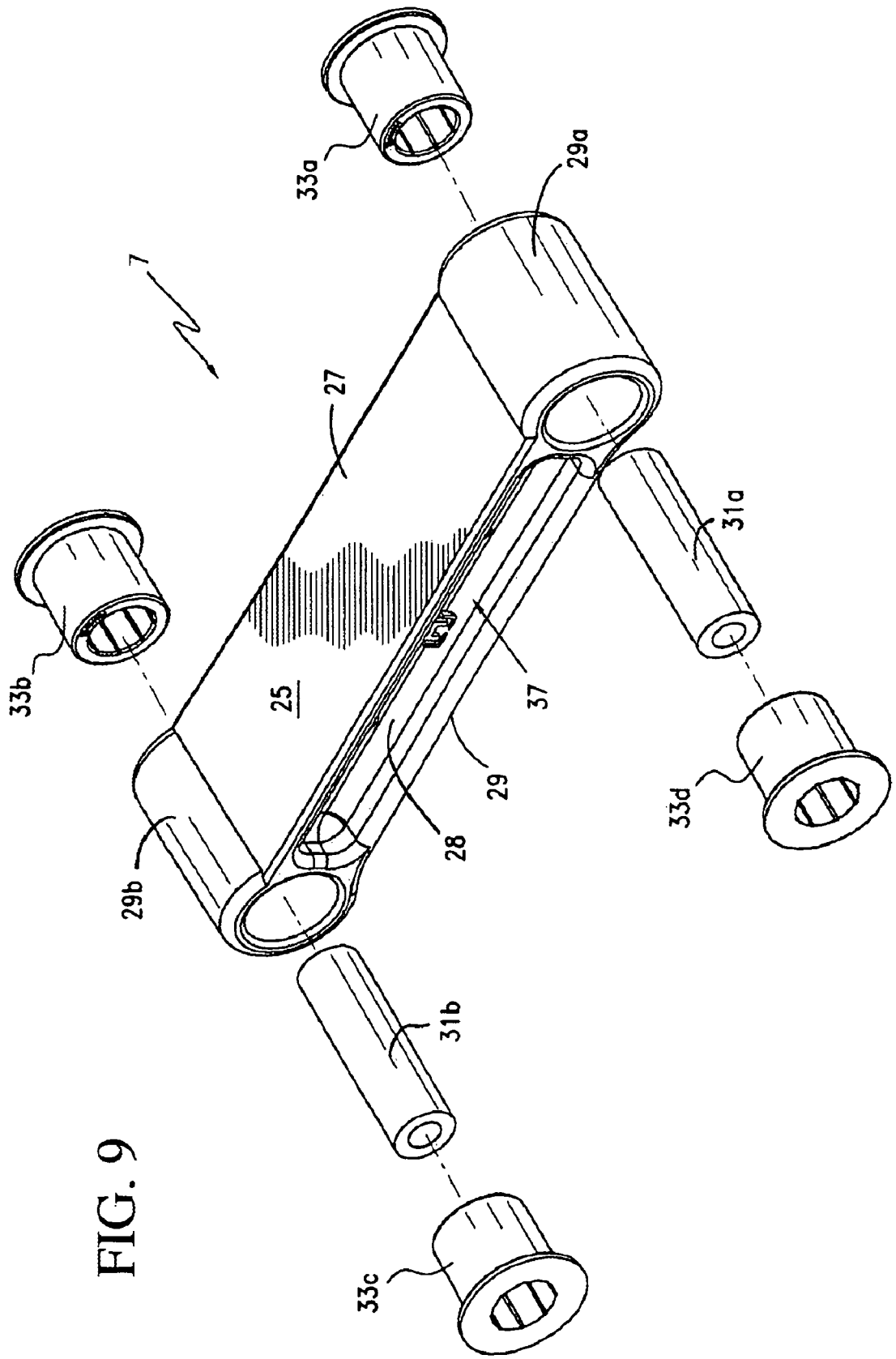
FIG. 9 is an exploded view of the torque arms illustrated in FIG. 1.
Figure 10:
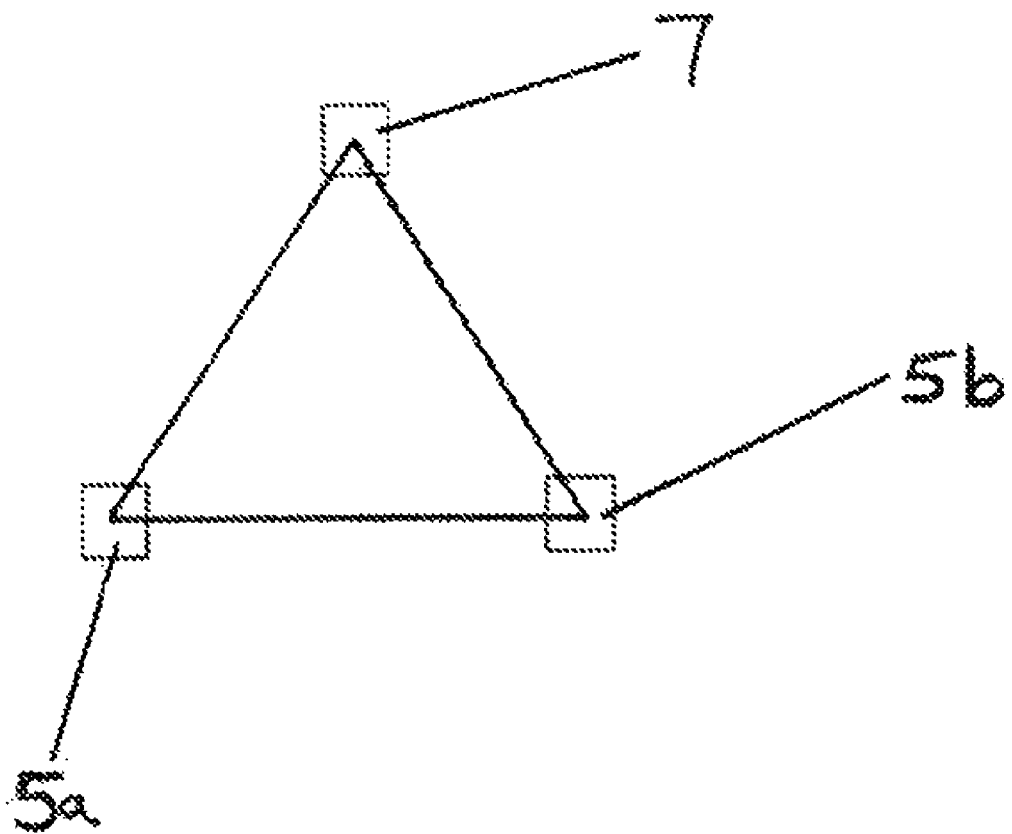
FIG. 10 is a schematic, cross-sectional view of one example embodiment in which three beams are oriented so as to form a substantially equilateral triangle shown schematically.

FIG. 9 illustrates a preferred construction for all three of these longitudinal beams, as described more fully below. Lower beams 5a and 5b are preferably located in substantially the same vertical plane as, and located below their vehicle frame member 3a and 3b (as shown in FIG. 1). Middle beam 7 is then located between opposing vehicle frame members 3a, 3b (as also shown in FIG. 1). In the preferred embodiment, as illustrated, beam 7, as aforesaid, is of the same construction as beams 5a, 5b, which construction is illustrated best, perhaps in FIG. 9. Such beams 5a, 5b and 7, as can be seen, are of substantially less width than the various configurations of the heavy duty beams illustrated in the aforesaid U.S. Pat. No. 6,527,286. The beams of the subject invention herein are much lighter in weight and far less space consuming than the devices in the aforesaid '286 patent. Yet, at the same time, when used as illustrated, such a beam configuration is highly effective in achieving roll stability, a feature essential to highway and vehicle operation safety.

In this respect, in the preferred embodiments as illustrated, middle beam 7 is pivotably connected at one end to a structural cross beam 9. Cross beam 9 is connected at each end, conveniently by appropriate bracketry as illustrated, to opposing vehicle frame members 3a and 3b, respectively. Middle beam 7 is then conveniently attached at its other end to axle 13 by appropriate retainer bracket 15. In certain preferred embodiments, beam 7 is located at the mid-point between, and extends parallel to, opposing vehicle longitudinal side rail frame members 3a, 3b. Beam 7, like beams 5a, 5b are connected by conventional, resilient bushing connections well-known in the suspension art and, as further described as aforesaid below, with respect to FIG. 9.

Suspension 1 further includes, on each side of the vehicle (one side of the suspension being a duplicate of the other) in addition to the beam structure described above, frame hanger brackets 11a and 11b, which serve to connect an end of a respective beam 5a and 5b to the matching vehicle frame member 3a and 3b. At the opposite end of each beam 5a and 5b, such ends are connected by similar resilient bushing 10 connections, as described above, to pedestals 17a and 17b. Pedestals 17a and 17b retain thereon, via appropriate u-bolts 19, axle 13, as well as conventional air bellows 21a and 21b of either the convoluted or non-convoluted (rolling lobe) type. Such air bellows 21a and 21b are well-known for providing ride comfort and cargo protection and are used herein for their known purpose. However, such rubber bellows, even when filled with and maintained at the proper pressure, usually via an air compressor, either alone or associated with the air brake system of the vehicle, do not have, of themselves, sufficient inherent roll stability. Thus, a need arises to insure such roll stability by other structural members of the suspension, as this invention effectively now does.

It is further to be noted that while u-bolts 19 are employed to attach axle 13 to the suspension and while axle 13 is shown with its enlarged transmission housing 23 as a drive axle (the drive shaft being omitted for convenience), it is understood that the suspensions of this invention need not be employed in this particular configuration, but are also applicable for use on, for example, trailers without drive axles, or in a configuration (not shown) where the axle is connected to the beam in a conventional manner, other than with a conventional u-bolt attachment as shown. Still further, while the axle is shown as attached to the top surface of pedestals 17a and 17b, it may also be, alternatively and conventionally, attached in the so-called "under slung" position to the underside of an appropriately constructed pedestals 17a and 17b.

The suspensions illustrated in the figures are equally useful as either "trailing arm" or "leading arm" suspensions. These terms are well understood in the art and refer to the location of the longitudinal beams 5a, 5b (and here beam 7 as well) with respect to the air bellows 21a and 21b, as their location relates to the direction of forward travel of the vehicle. As illustrated in FIG. 1, arrow A illustrates one forward direction of travel and arrow B illustrates the opposite forward direction of travel. Arrow A illustrates suspension 1 when the air bellows (e.g., 21a or 21b) lead their beams 5a, 5b, respectively, with respect to the forward direction of travel of the vehicle on which suspension 1 is mounted. This configuration is conventionally designated as a "leading arm" suspension (i.e., the beam leads the hanger bracket to which it is attached when the vehicle is driven forward). The opposite configuration, equally conventional, is known then as a "trailing arm" suspension (i.e., the beam trails the hanger bracket to which it is attached when the vehicle is driven in its forward direction). The figures are purposely illustrated herein to be generic, so as to illustrate that both positions, i.e., "leading" or "trailing" arm are applicable to the suspensions of this invention.

The term "less than the entire space" is used herein to define and differentiate the space (particularly, the lateral space) that middle longitudinal beam 7 of this invention occupies compared to the significantly larger middle beams of various configurations as disclosed in the aforesaid U.S. Pat. No. 6,527,286. Not only does this subject invention achieve effective roll stability, but it uses significantly less space between the frame rails than the beams of this '286 patent (e.g., numbered 40, 40' and 40" in patent '286). Such space saving, as well as weight reduction, are both features highly desired in the truck and trailer industry, enabling (by using less space) more options for componentry location, as well as more profitability by way of increasing the allowable, safe limits for the amount of cargo to be carried. For example, in a typical truck, side rails 3a and 3b [or items 12 in the aforesaid '286 patent] are conventionally about 34 inches apart, center line to center line. Lower longitudinal beams 5a, 5b like the radius rods of the '286 patent, consume no space between the frame rails of the vehicle and in the preferred embodiments of the subject invention, they are located in substantially the same plane as its respective frame rail. Moreover, middle beam 7, in preferred embodiments is normally only about 5-10 inches wide, thus, consuming considerably less space between the frame members than the aforesaid prior art devices.

In the illustrated embodiment of the aforesaid '286 patent, the radius rods are located somewhat outboard of the vehicle's frame rails. While such a location can be employed in the subject invention simply by using the appropriate hanger shape for hangers 11a, 11b and pedestals 17a, 17b, the more preferred way is, as illustrated in FIG. 1, et al. to locate this componentry in substantially the same vertical plane as the frame member of the vehicle to which it is attached. The term "substantially" is purposely used because as illustrated, some outboard offset to facilitate attachment of the hanger brackets to the outside vertical surface of its respective vehicle frame member is contemplated in certain embodiments. In this respect, it is to be noted that the air bellows are, in the preferred embodiments of this invention, as illustrated, located substantially beneath their respective vehicle frame rail to which they are attached for more effective ride quality, without the use of additional, undesirable weight adding componentry to achieve a substantial offset.

Turning now to FIG. 9, the longitudinal beam structure of beam 7 and preferably also beams 5a, 5b is illustrated with more particularity. Omitted, for convenience, are conventional bolts and nuts which extend through the orifices at the ends of the beams to connect the beams to their respective suspension componentry. Thus, as illustrated, beam 7 (used here as the exemplar, beams 5a and 5b being of the same construction and design) includes a central structure 25 comprised of top wall 27 and bottom wall 29. At each end of central structure 25, there is located an enlarged portion 29a and 29b, respectively. These enlarged portions house their respective resilient bushing members 33a, 33b, 33c and 33d, respectively, as well as metallic sleeves 31a, 31b.

Once given the above disclosure, many other features, modifications, and improvements will become apparent to the skilled artisan. Such other features, modifications, and improvements are, therefore, considered to be a part of this invention, the scope of which is to be determined by the following claims.

I claim:

1. A roll-stable axle suspension system comprising:
   first and second opposing, spaced apart longitudinal vehicle frame members;
   a first suspension hanger bracket connected to and extending downwardly from said first longitudinal frame member;
   a second suspension hanger bracket located generally opposite said first suspension hanger bracket and connected to and extending downwardly from said second longitudinal frame member;
   a first air bellows operatively connected at an upper end to and generally beneath said first longitudinal frame member at a location along said first longitudinal frame member spaced apart from said first suspension hanger bracket and operatively connected at a lower end to a first pedestal;
   a second air bellows operatively connected at an upper end to and generally beneath said second longitudinal frame member at a location along said second longitudinal frame member spaced apart from said second suspension hanger bracket and operatively connected at a lower end to a second pedestal;
   a first longitudinal beam having a first end connected to said first suspension hanger bracket and a second end connected to said first pedestal;
   a second longitudinal beam having a first end connected to said second suspension hanger bracket and a second end connected to said second pedestal;
   an axle, housed in an axle housing, for carrying vehicle wheels, said axle connected proximal a first end to said first pedestal and connected proximal a second end to said second pedestal;
   a cross beam connected to and between said first and said second longitudinal vehicle frame members; and
   a third longitudinal beam connected at a first end to said cross beam and at a second end to said axle housing, said third longitudinal beam being located positioned between said first and second longitudinal frame members and being sized in width such that said third longitudinal beam occupies substantially less than the entire lateral distance between said first and said second longitudinal vehicle frame members;
   wherein said first, second, and third longitudinal beams are each so constructed so as to be substantially greater in width than in height; and wherein said first, second, and third beams, in combination, provide roll stability to said axle suspension system without a cross beam located connected to and between said first and said second pedestals and without a beam connected to and between one of said first and second longitudinal vehicle frame members and said axle housing.

2. The axle suspension system according to claim 1 wherein each of said first, second, and third longitudinal beams are formed of a continuous top plate and a continuous bottom plate joined together by opposing, spaced side plates.

3. The axle suspension system according to claim 2 wherein said first, second, and third longitudinal beams are substantially similar in configuration.

4. The axle suspension system according to claim 2 wherein each of said first, second, and third longitudinal beams has an orifice extending through at least substantially the entire width proximal each end portion.

5. The axle suspension system according to claim 4 wherein each of said first and said second longitudinal beams is located offset from a vertical plane of said first and second longitudinal vehicle frame members, respectively.

6. The axle suspension system according to claim 5 wherein each of said first and said second air bellows is located in a substantially common vertical plane with each of said first and second longitudinal vehicle frame members, respectively.

7. The axle suspension system according to claim 4 wherein each of said first and said second air bellows is located in a substantially common vertical plane with each of said first and second longitudinal vehicle frame members, respectively.

8. The axle suspension system according to claim 7 wherein said cross beam is connected to and between said first and said second longitudinal vehicle frame members in substantially the same longitudinal location as said first and said second suspension hanger brackets.

9. The axle suspension system according to claim 7 wherein the connections of said first and second longitudinal beams to said first and second suspension hanger brackets, respectively, and to said first and second pedestals, respectively, are pivot connections.

10. The axle suspension system according to claim 9 wherein the connections of said third longitudinal beam to said cross beam and to said axle housing are pivot connections.

11. The axle suspension system according to claim 10 wherein said third longitudinal beam is located at the approximate midpoint between, and extends generally parallel, in at least one plane, to said first and said second longitudinal vehicle frame members.

12. The axle suspension system according to claim 11 further including an axle housing bracket located on said axle housing and wherein said second end of said third longitudinal beam is connected to said axle housing bracket.

13. The axle suspension system according to claim 10 further including an axle housing bracket located on said axle housing and wherein said second end of said third longitudinal beam is connected to said axle housing bracket.

14. The axle suspension system according to claim 10 wherein said first, second, and third longitudinal beams are so located and oriented with respect to each other such that when they are bisected in a vertical plane, said beams form a cross-sectional, substantially equilateral triangle such that said third longitudinal beam is an apex of said triangle and wherein said first and second longitudinal beams are located within the same horizontal plane with respect to each other when said suspension system is in a travel position.

15. The axle suspension system according to claim 10 wherein said third longitudinal beam is between about 5 to 10 inches wide.

16. A wheeled vehicle in combination with said axle suspension system according to claim 15.

17. A wheeled vehicle in combination with said axle suspension system according to claim 10.

18. The axle suspension system according to claim 7 wherein said third longitudinal beam is located at the approximate midpoint between, and extends generally parallel, in at least one plane, to said first and said second longitudinal vehicle frame members.

19. The axle suspension system according to claim 7 wherein said first, second, and third longitudinal beams are substantially similar in configuration.

20. The axle suspension system according to claim 7 wherein said third longitudinal beam is between about 5 to 10 inches wide.

21. A wheeled vehicle in combination with said axle suspension system according to claim 7.

22. The axle suspension system according to claim 1 wherein said third longitudinal beam is between about 5 to 10 inches wide.

23. A wheeled vehicle in combination with said axle suspension system according to claim 1.

24. A roll-stable axle suspension system comprising:
first and second opposing, spaced apart longitudinal vehicle frame members;
a first suspension hanger bracket connected to and extending downwardly from said first longitudinal frame member;
a second suspension hanger bracket located generally opposite said first suspension hanger bracket and connected to and extending downwardly from said second longitudinal frame member;
a first air bellows operatively connected at an upper end to and generally beneath said first longitudinal frame member at a location along said first longitudinal frame member spaced apart from said first suspension hanger bracket and operatively connected at a lower end to a first pedestal;
a second air bellows operatively connected at an upper end to and generally beneath said second longitudinal frame member at a location along said second longitudinal frame member spaced apart from said second suspension hanger bracket and operatively connected at a lower end to a second pedestal;
a first longitudinal beam having a first end connected to said first suspension hanger bracket and a second end connected to said first pedestal;
a second longitudinal beam having a first end connected to said second suspension hanger bracket and a second end connected to said second pedestal;
an axle, housed in an axle housing, for carrying vehicle wheels, said axle connected proximal a first end to said first pedestal and connected proximal a second end to said second pedestal;
a cross beam connected to and between said first and said second longitudinal vehicle frame members; and
a third longitudinal beam connected at a first end to said cross beam and at a second end to said axle housing, said third longitudinal beam being located positioned between said first and second longitudinal frame members and being sized in width such that said third longitudinal beam occupies substantially less than the entire lateral distance between said first and said second longitudinal vehicle frame members;
wherein said first, second, and third longitudinal beams are each so constructed so as to be substantially greater in width than in height; and
wherein said first, second, and third beams, in combination, provide roll stability to said axle suspension system without a cross beam located connected to and between said first and said second pedestals and without a beam connected to and between one of said first and second longitudinal vehicle frame members and said axle housing.

25. The axle suspension system according to claim 24 wherein each of said first and second longitudinal beams are formed of a continuous top plate and a continuous bottom plate joined together by opposing, spaced side plates.

26. The axle suspension system according to claim 25 wherein each of said first and said second air bellows is located in a substantially common vertical plane with each of said first and second longitudinal vehicle frame members, respectively.

* * * * *